(12) United States Patent
Hu

(10) Patent No.: US 8,008,803 B2
(45) Date of Patent: Aug. 30, 2011

(54) POWER SUPPLY CIRCUIT FOR MOTHERBOARD

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 659 days.

(21) Appl. No.: 12/189,107

(22) Filed: Aug. 8, 2008

(65) Prior Publication Data

US 2010/0007440 A1 Jan. 14, 2010

(30) Foreign Application Priority Data

Jul. 10, 2008 (CN) .......................... 2008 1 0302682

(51) Int. Cl.
*H05K 1/02* (2006.01)
*H03H 1/00* (2006.01)

(52) U.S. Cl. .......................................... 307/42; 323/370
(58) Field of Classification Search .................... 307/42, 307/140, 31; 323/370
See application file for complete search history.

(56) References Cited

U.S. PATENT DOCUMENTS 7,746,044 B2 * 6/2010 Chen et al. .................... 323/266

* cited by examiner

*Primary Examiner* — Michael Rutland Wallis
(74) *Attorney, Agent, or Firm* — Altis Law Group, Inc.

(57) ABSTRACT

A power supply circuit includes a first resistor and a first capacitor. One end of the first resistor is connected to a system power. The other end of the first resistor is connected to the anode of the first capacitor. The cathode of the first capacitor is connected to a digital analog converter A (DACA) VDD pin of a north bridge on a motherboard. The system power provides a stable power signal for the DACA VDD of the north bridge via the first resistor and the first capacitor. Thereby the display no longer ripples when the resolution of the display is adjusted to a certain value.

12 Claims, 1 Drawing Sheet

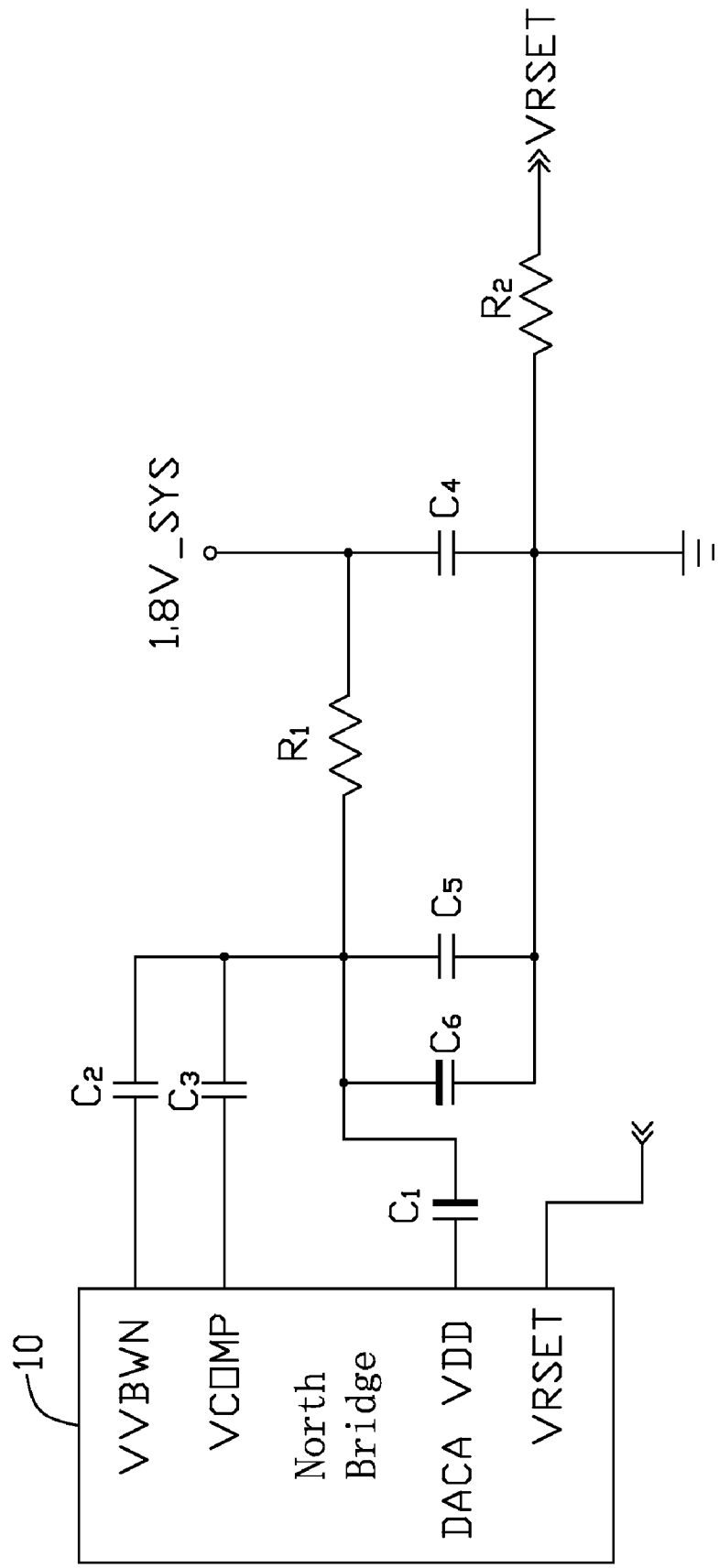

POWER SUPPLY CIRCUIT FOR MOTHERBOARD

BACKGROUND

1. Field of the Invention

The present invention relates to power supply circuits and, particularly, to a power supply circuit for a motherboard in a computer.

2. Description of the Related Art

In electronics and particularly in computer electronics, motherboards are one of the most important parts. Power supply circuits are used to provide working voltages for motherboards, and are absolutely necessary, especially for the north bridge. A digital to analog converter A (DACA) analog output pin, herein called a DACA VDD pin, of the north bridge provides a DACA VDD signal to control a vertical synchronization (VSYNC) signal and a horizontal synchronization (HSYNC) signal output from the north bridge to a display. However, a conventional power supply circuit includes an inductor-capacitor (LC) oscillating circuit for providing power to the DACA VDD pin. But sometimes, the power provided to the DACA VDD pin is unstable, which can adversely affect the VSYNC signal and HSYNC signal and cause ripples in the display.

What is needed, therefore, is to provide a power supply circuit for a motherboard which can provide stable power to the north bridge.

BRIEF DESCRIPTION OF THE DRAWING

The drawing is a circuit diagram of an embodiment of a power supply circuit for a motherboard in accordance with the present invention.

DETAILED DESCRIPTION

Referring to the drawing, a power supply circuit for a motherboard in accordance with an embodiment of the present invention is configured to supply power to a north bridge 10 on a motherboard and, especially, to a digital to analog converter A (DACA) analog output pin, herein called DACA VDD pin, of the north bridge 10. The power supply circuit includes two resistors R1 and R2, two electrolytic capacitors C1 and C6, and four capacitors C2, C3, C4, and C5.

A first end of the resistor R1 is arranged to receive a system power 1.8V_SYS. A second end of the resistor R1 is connected to the anode of the electrolytic capacitor C1. The cathode of the electrolytic capacitor C1 is connected to the DACA VDD pin of the north bridge 10. The second end of the resistor R1 is also connected to a voltage reference pin VVBWN and a voltage compensation pin VCOMP of the north bridge 10 via the capacitors C2 and C3 connected in parallel, respectively. Furthermore, the second end of the resistor R1 is also grounded via the capacitor C5. The anode of the electrolytic capacitor C6 is connected to the second end of the resistor R1. The cathode of the electrolytic capacitor C6 is grounded. The system power 1.8V_SYS is grounded via the capacitor C4. A voltage reference resistor pin VRSET of the north bridge 10 is grounded via the resistor R2. The DACA VDD pin, the VVBWM pin, the VCOMP pin, and the VRSET pin are part of the video graphics array (VGA) portion of the north bridge 10.

In the present embodiment, the resistance of the resistor R1 is 10 Ohms, and the resistance of the resistor R2 ranges from 99 Ohms to 101 Ohms. The capacitance of the electrolytic capacitor C1 is 10 µF. The capacitance of the electrolytic capacitor C6 is 4.7 µF. The capacitances of the electrolytic capacitors C2, C3, and C5 all range from 0.08 µF to 0.18 µF. The capacitance of the capacitor C4 ranges from 8 nF to 18 nF.

The resistor R1 and the electrolytic capacitor C1 forms a first resistor-capacitor (RC) circuit, which can be used to delay the activation of the circuit. The system power 1.8_SYS provides a stable power signal for the DACA VDD pin of the north bridge 10 via the first RC delay circuit. The resistor R1 and the capacitor C2 forms a second RC delay circuit. The system power 1.8_SYS provides a stable power signal for the VVBWN pin of the north bridge 10 via the second RC delay circuit. The resistor R1 and the capacitor C3 forms a third RC delay circuit, and the system power 1.8_SYS provides a stable power signal for the VCOMP pin of the north bridge 10 via the third RC delay circuit. The resistor R2 and the capacitor C4 forms a fourth RC delay circuit, and the system power 1.8_SYS provides a stable power signal for the VRSET pin of the north bridge 10 via the fourth RC delay circuit. The capacitor C5 and the electrolytic capacitor C6 are configured for wave filtering and eliminating or reducing influence of noise signals.

The present embodiment provides a stable power signal for the DACA VDD pin of the north bridge 10 via the first RC delay circuit rather than an LC oscillating circuit. Thereby a vertical synchronization (VSYNC) signal and a horizontal synchronization (HSYNC) signal output from the north bridge are no longer affected. As a result, the display no longer ripples when the resolution of the display is adjusted to a certain value.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit, comprising:
    a first resistor comprising:
        a first end connected to a system power; and
        a second end; and
    a first capacitor comprising:
        a first end connected to the second end of the first resistor; and
        a second end connected to a digital analog converter A (DACA) analog output pin, of a north bridge on a motherboard;
    wherein the system power provides a stable power signal for the DACA analog output pin of the north bridge via the first resistor and the first capacitor.

2. The power supply circuit as claimed in claim 1, wherein the resistance of the first resistor is 10 Ohms.

3. The power supply circuit as claimed in claim 1, wherein the capacitance of the first capacitor is 10 µF.

4. The power supply circuit as claimed in claim 1, wherein the first capacitor is an electrolytic capacitor comprising:
    an anode connected to the second end of the first resistor; and
    a cathode connected to the DACA analog output pin of the north bridge.

5. The power supply circuit as claimed in claim 1, wherein the power supply circuit further comprises a second capacitor connected between the second end of the first resistor and a voltage reference pin VVBWN of the north bridge.

6. The power supply circuit as claimed in claim 5, wherein the power supply circuit further comprises a third capacitor connected between the second end of the first resistor and a voltage compensation pin VCMOP of the north bridge.

7. The power supply circuit as claimed in claim 6, wherein the capacitances of the second and the third capacitor range from 0.08 µF to 0.18 µF.

8. The power supply circuit as claimed in claim 6, wherein the power supply circuit further comprises a fourth capacitor and a second resistor, the system power is connected to a voltage reference resistor pin VRSET pin via the fourth capacitor and the second resistor in series, and is grounded via the fourth capacitor.

9. The power supply circuit as claimed in claim 8, wherein the capacitance of fourth capacitor ranges from 8 nF to 18 nF.

10. The power supply circuit as claimed in claim 1, wherein the power supply circuit further comprises a second capacitor and a third capacitor, the second capacitor and the third capacitor are connected in parallel between the second end of the first resistor and ground.

11. The power supply circuit as claimed in claim 10, wherein the capacitance of the second ranges from 0.08 µF to 0.18 µF, and the capacitance of the third capacitor is 4.7 µF.

12. The power supply circuit as claimed in claim 10, wherein the third capacitor is an electrolytic capacitor, the third capacitor comprises:
    an anode connected to the second end of the first resistor; and
    a cathode being grounded.

* * * * *